United States Patent [19]

Effenberger et al.

[11] Patent Number: 4,883,716
[45] Date of Patent: Nov. 28, 1989

[54] METHOD FOR MANUFACTURE OF CAST FLUOROPOLYMER-CONTAINING FILMS AT HIGH PRODUCTIVITY

[75] Inventors: John A. Effenberger, Bedford; Keith G. Koerber, Goffstown, both of N.H.; Michael N. Latorra, North Palm Beach; John V. Petriello, Palm Beach Gardens, both of Fla.

[73] Assignee: Chemical Fabrics Corporation, Merrimack, N.H.

[21] Appl. No.: 226,614

[22] Filed: Aug. 1, 1988

[51] Int. Cl.⁴ .................... B32B 7/02; B29C 41/28; B29C 41/32; C08F 114/18
[52] U.S. Cl. .................... 428/421; 264/127; 264/215; 264/216; 428/422; 526/247; 526/249; 526/250; 526/254; 526/255
[58] Field of Search ............... 264/127, 215, 216; 428/421, 422; 526/247, 249, 250, 254, 255

[56] References Cited

U.S. PATENT DOCUMENTS 2,923,651  2/1960  Petriello ............... 264/215 X
2,961,345  11/1960  Petriello ............... 264/215
3,282,725  11/1966  Van Zalinge ............... 264/215 X
4,112,037  9/1978  Parker et al. ............... 264/127 X Primary Examiner—Philip Anderson
Attorney, Agent, or Firm—White & Case

[57] ABSTRACT

A method is provided for preparation of a fluoropolymeric film on a carrier, comprising:
(a) preparing an aqueous dispersion comprising a fluoropolymer;
(b) dipping a carrier belt through the dispersion such that a coating of the dispersion is formed on the carrier belt;
(c) passing the coated carrier belt through a metering zone to remove excess dispersion;
(d) drying the metered coated carrier to remove the water from the dispersion; and
(e) heating the dried coated carrier to a temperature sufficient to consolidate the dispersion, wherein the carrier belt is formed from a material of low thermal mass having chemical and dimensional stability at the consolidation temperature of the dispersion and a work of adhesion between the carrier belt and the dispersion that does not exceed the yield strength of the consolidated fluoropolymeric film.

12 Claims, 1 Drawing Sheet

METHOD FOR MANUFACTURE OF CAST FLUOROPOLYMER-CONTAINING FILMS AT HIGH PRODUCTIVITY

BACKGROUND OF THE INVENTION

The present invention relates to a method of producing fluoropolymer films at high productivity and to films produced using the method.

The production of thin plastic films has generally been accomplished using one or more of three processes: melt extrusion, casting from solutions or organosols, and casting from aqueous dispersions. Melt extrusion of films is generally preferred to casting since it does not require the removal of an organic solvent, water, or surfactants. It therefore produces a very clean film and typically is characterized by high productivity. Melt extrusion cannot, however, be used for all materials.

Casting methods are preferred if the required time at extrusion temperature is sufficient to result in thermal or oxidative degradation of the polymer. Casting is also preferred when the melt viscosity of the polymer is sufficiently high to make extrusion either technically impossible or economically impractical.

In the case of fluoroplastics, all three processes are used to produce films, with the choice of process largely depending on the monomer content of the polymer. The most common monomers presently employed to produce fluoroplastics include tetrafluoroethylene (TFE), chlorotrifluoroethylene (CTFE), vinylidene fluoride ($VF_2$), and vinyl fluoride (VF). All of these are available as homopolymers; i.e., PTFE (e.g. "Teflon"), PCTFE (e.g. "KelF"), $PVF_2$ (e.g. "Kynar"), and PVF (e.g. "Tedlar"), respectively. PCTFE and $PVF_2$ are melt extrudeable as thin films with some difficulty due to the fact that the time/temperature history during extrusion is near to that which could result in polymer degradation at the severe shear rate of melt extrusion. This condition can be further aggravated in the presence of certain fillers. PVF film cannot be produced by melt extrusion due to thermal instability and thus is produced by a casting process and subsequently is biaxially stretched. Homopolymer PTFE cannot be practically melt extruded at all due its extraordinarily high melt viscosity.

In order to overcome such problems in the case of melt extrusion of these homopolymers, copolymers of these monomers have been developed which are generally lower in melting temperature and melt viscosity at extrusion temperatures. This allows extrusion of the polymers at temperatures at which no significant thermal degradation occurs. Consequently, fluoropolymer films are most generally based upon such readily extrudeable copolymers. These include copolymers of TFE with hexafluoropropylene, e.g., "Teflon" FEP, or with perfluoroalkyl vinyl ethers, e.g., "Teflon" PFA, or with ethylene, e.g. "Tefzel" ETFE. Similarly, copolymers of CTFE include those with vinylidene fluoride or hexafluoropropylene, e.g., "Kynar", as well as with ethylene, e.g., "Halar". Terpolymers of these basic monomers are also known and used in extrusion.

Since pure PTFE cannot be melt extruded, as mentioned above, other processes have been developed for film production. One such method involves the skiving of thin film from a molded and sintered billet. Another involves the casting of an aqueous dispersion onto a metallic carrier. The deposited resin is subsequently stripped from the carrier to yield a very high quality film relative to the skived films.

A casting process for PTFE is described in U.S. Pat. No. 2,852,811 issued to John V. Petriello in 1958, which is incorporated herein by reference. In summary, this process involves continuously depositing a layer of a PTFE dispersion onto a metal carrier, drying the coated carrier and then sintering the dried coating. These steps are then repeated until a film of the desired thickness had been formed. The film is then stripped from the carrier. U.S. Pat. No. 2,852,811 stresses the importance of the nature of the carrier belt used in the casting process. Thus, highly polished, corrosion resistant metal carrier belts have been used in subsequent casting efforts.

Cast PTFE films exhibit virtually no mechanical anisotropy, and have substantially higher tensile strength, elongation, and dielectric breakdown strength than skived PTFE films. Unfavorable process economics, however, have prevented a wide acceptance of casting as a method for making fluoropolymer films. Among the factors affecting the economics are the properties of the metal carrier belts. These belts are fairly rigid and heavy, and thus require a special tracking mechanism to drive the belt through the apparatus. This essentially fixes the width of the material produced, causing a loss in versatility.

The casting process as described by Petriello also suffers as a result of low productivity. In an effort to elaborate upon the significant process parameters affecting film quality, investigations were sponsored by the Aeronautical Systems Division of the United States Air Force between 1955 and 1962 which resulted in the publication of a report entitled "Production Refinement of Very Thin Teflon Film." This publication emphasized the importance of the dispersion characteristics and line speed as each can significantly affect the quality of the cast film. Specifically, the Air Force study observed that the quality of film produced by the casting method deteriorates very rapidly at line speeds above 3 feet per minute. (See P. 19 "Production of Very Thin Teflon Film"). Productivity of film manufacture at such slow rates is in general prohibitively costly: even simple, monolithic cast films of PTFE must be sold at four to five times the price of skived PTFE or two to three times that of extruded FEP to be economically attractive. This has led to very minimal acceptance of cast films in the marketplace and has been the major cause of the lack of continued research over the past decades into processes for casting fluoropolymer films.

Additionally, the very low critical cracking thickness of most fluoropolymer dispersions suggest that thicker individual lamellae within any given film cannot be achieved to even partially offset the poor productivity associated with very low linear line speed.

It is of interest to note, however, that all of the previously mentioned fluoroplastic homopolymers and copolymers are available as aqueous dispersions and can be used to produce cast films. Moreover, the casting process potentially offers several distinct advantages over the extrusion process for producing films. The casting process inherently is a multi-layering process; thus, multi-layer film production by casting methods avoids the intrinsic problems and substantial unit investment which would be associated with coextrusion or extrusion coating of fluoropolymers. PTFE films with surface(s) of fluorinated ethylene propylene (FEP) or perfluoroalkoxy resins (PFA) are available commercially from casting equipment. Additionally, the casting of alloyed fluoropolymers, including both thermoplastic and elastomeric polymers and which may optionally incorporate metal, mineral, or ceramic additives to modulate chemical, optical, electrical, and magnetic transport properties of film is facilitated by the casting process in both monolithic (uniform composition) and complex (non-uniform composition) film format. Such films are described in commonly assigned U.S. patent application Ser. Nos. 600,002 and 908,938, and U.S. Pat. Nos. 4,555,543 and 4,610,918, all four of which are incorporated herein by reference. Most importantly, such a process permits one to combine in a single layer, or in sequential layers, polymers with widely different melting temperatures and degradation temperatures since the time/temperature history of the film as it is processed can be kept much shorter than that characteristic of melt extrusion.

In short, the casting process is an inherently much more powerful method than the extrusion process for producing high quality films with a far larger number of compositional degrees of freedom. It is an object of the present invention to provide a method for the production of fluoropolymer films in which the relationship between productivity and film quality is dramatically altered such that one can economically take advantage of this superiority. The products of this process could enjoy significant use in electrical and electronic applications as well as in selective membranes and other chemical applications.

SUMMARY OF THE INVENTION

This object is achieved in accordance with the invention using a method for preparation of a fluoropolymeric film on a carrier, comprising:

(a) preparing an aqueous dispersion comprising a fluoropolymer;

(b) dipping a carrier belt through the dispersion such that a coating of the dispersion is formed on the carrier belt;

(c) passing the coated carrier belt through a metering zone to remove excess dispersion;

(d) drying the metered coated carrier to remove the water from the dispersion; and (e) heating the dried coated carrier to a temperature sufficient to consolidate the dispersion, wherein the carrier belt is formed from a material of low thermal mass having chemical and dimensional stability at the consolidiation temperature of the dispersion and a work of adhesion between the carrier belt and the dispersion that does not exceed the yield strength of the consolidated fluoropolymeric film.

Thus, the method of the present invention defines a film casting process which differs from that of the prior art in at least two critical aspects—the use of metering equipment to define the amount of fluoropolymer dispersion on the carrier belt and the use of a carrier belt having a low thermal mass. These alterations allow operation of the system at line speeds in excess of 10 linear feet per minute, a speed that substantially improves the productivity relative to the prior art. At the same time, the films made in accordance with the present invention suffer little, if any, reduction in the quality of films produced at higher productivity relative to the prior art.

DETAILED DESCRIPTION OF THE INVENTION

Figure 1:
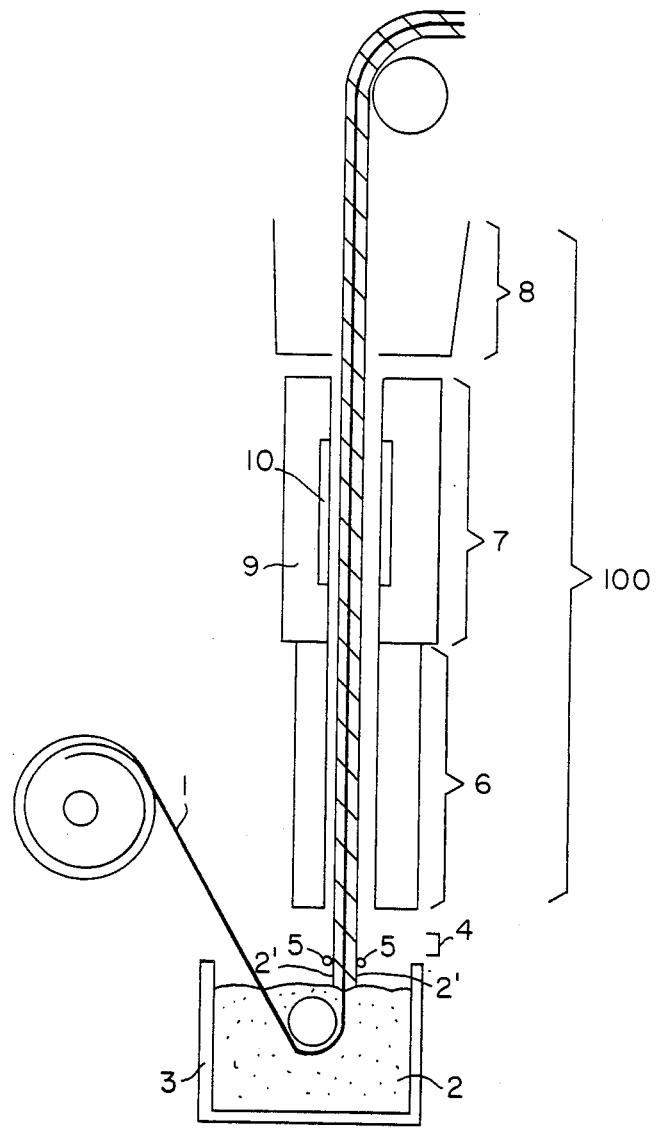
FIG. 1 shows a schematic of an apparatus for carrying out the method of the invention.

In accordance with the invention, fluoropolymer films are formed by casting onto a carrier belt having low thermal mass. This carrier belt is preferably part of a casting apparatus such as that depicted in FIG. 1. The carrier belt 1 is dipped through a fluoropolymer dispersion 2 in a dip pan 3 at the base of a casting tower 100 such that a coating of dispersion 2' forms on the carrier belt 1. The coated carrier belt 1 then passes through a metering zone 4 in which metering bars 5 remove excess dispersion from the coated carrier belt. After the metering zone, the coated carrier belt passes into a drying zone 6 which is maintained at a temperature sufficient to remove the carrier liquid from the dispersion giving rise to a dried film. The carrier belt with the dried film then passes to a bake/fuse zone 7 in which the temperature is sufficient to consolidate or fuse the fluoropolymer in the dispersion. Finally, the carrier belt passes through a cooling plenum 8 from which it can be directed either to a subsequent dip pan to begin formation of a further layer of the film or to a stripping apparatus such as that illustrated in U.S. Pat. No. 2,852,811.

In a preferred embodiment of the invention, the bake/fuse zone 7 is heated using dual heat sources, a conventional oven 9 that maintains the temperature at about 300° F. to 710° F., and a radiant electric heater 10 that raises web the temperature to one sufficient to consolidate the fluoropolymer, i.e., about 700° F. or higher in the case of PTFE.

The method of the invention provides superior performance by varying several aspects of the previously known method for casting fluoropolymer films: (1) the nature of the carrier or casting medium, (2) the nature of the casting fluids, (3) the nature of the metering methods used to apply the casting fluids to the carrier, and (4) the state of consolidation of the polymers as they proceed from the drying fluid to the fused and recrystallized or solidified films. Each of these requires some discussion to understand the significant advances of the present invention as distinguished from the prior art.

1. Nature of the Carrier

The state-of-the-art teaches the suitability of metallic carriers which are preferably made of stainless steel polished to a specific surface smoothness to maintain sufficient adhesion to hold the in-process film to the carrier, but not so rough as to provide an anchorage which could prevent stripping entirely or lead to distortion of the film during stripping. Aluminum foils are also useful as a carrier, but are less satisfactory than stainless steel for several reasons: they are quickly annealed during high temperature fusing of the applied polymers and, therefore, readily damaged in subsequent use. They are also prone to creasing or wrinkling in-process and susceptible to chemical modification of their surfaces by the aqueous ammoniacal solutions characteristic of many fluoropolymer dispersions.

The primary disadvantage of the preferred stainless steel carrier of the prior art is its need to be fully tempered and relatively stiff for tracking purposes. This results in a carrier with sufficient stored mechanical energy under tension to be difficult to manage at high speed. Thus, while suitable at line speeds of 3 to 8 fpm, it is not a good candidate for higher speed (10 to 30 fpm) operation. Additionally, the actual adhesion of consolidated fluoropolymer films to the steel is a function of the number of uses of the steel belt which needs periodic refurbishment to reestablish appropriate adhesion for strippability. Lastly, at the 5 to 8 mil gauge employed for trackability/mechanical stability, the steel belt possesses substantial thermal mass relative to the much thinner (0.15 to 1.5 mil) depositions of resin in any one lamellae. This leads to repeated heating and cooling requirements in the casting process which is wasteful of energy and limits the rate at which the polymers can be quenched. The slow cooling that results can have an impact on the quality of the product film, particularly in the degree of crystallinity.

The invention overcomes these difficulties by using superior carriers that are thinner and that exhibit lower adhesion to the polymeric films and thereby better facilitate strippability. These materials also possess lower thermal mass, facilitating rapid quenching to yield exceptionally low crystallinity in the films. The carriers used in the invention are also less stiff and may be tracked using rollers in contact with the surface of the coated carrier belt, a method allowing very high speed operation at continuously variable widths. This latter feature can significantly reduce material yield losses.

The actual choice of carrier for any given film is dictated by the highest process temperature it will encounter, the work of adhesion developed between the carrier and the film surface in direct contact with it, and its chemical compatability with the casting fluids. In general, the carrier should be of low thermal mass, dimensionally stable at the maximum processing temperature, chemically resistant to all components of the casting fluids, and the work of adhesion between the deposited film and the carrier surface must not exceed the yield strength of the deposited film. Once these conditions are satisfied, the actual selection of a carrier for any given film from all carrier candidates is a matter of taking into account its useful life as well as its initial cost for the sake of economy.

Suitable carriers for casting of the invention films include:

a) Films of high melting thermoplastics, such as the thermoplastic polyimides, (e.g. Upilex ® from ICI) polyether-ether ketones (e.g. STABAR ® from ICI), polyaryl ketones from Union Carbide, polyphenylene sulfide (e.g. RYTON ® from Phillips Corp.), and polyetherimides (e.g. ULTEM ® from General Electric Co.). High melting perfluoropolymeric films may themselves be used for casting of the lower melting, partially fluorinated copolymers, such as TFB 7100D (a terpolymer of $VF_2$, TFE, and HFP) from Hoechst.

b) Films of thermosetting plastics, particularly of the high temperature capable thermosetting resins such as polyimides (e.g. Kapton ® H from DuPont) are particularly good carriers since they possess excellent high temperature thermal and dimensional stability as well as durable release characteristics. The surface free energy of the Kapton ® H is reported to be about 45 to 55 ergs/cm, yet has somewhat surprisingly proven to be an excellent candidate for accepting the casting fluids which typically have a surface tension of about 29 to 35 dynes/cm. It is suspected that certain additives in the casting fluids in someway abets wettability.

c) Coated or laminated textiles based upon the above thermoplastics or similar thermally stable resins and thermally stable reinforcements such as fiberglass, graphite, polyaramid (e.g. Kevlar ®), and aromatic polyamide (e.g. Nomex ®) yarns may also be used as a carrier to maximize dimensional stability at high temperature as opposed to an unsupported film. To avoid excessive stiffness in an otherwise suitable coated or laminated textile, it is desirable to employ a more flexible coating resin as a subsurface coating followed by a top-coat or lamination of the otherwise desirable, but too stiff composite. For example a PTFE perfluoroplastic or "Kalrez" perfluoroelastomeric coating on a thin, woven fiberglass substrate (e.g. Style 104 or 116) may be provided with a polyimide surface by top-coating or laminating.

d) Plastic Coated Metal Foil may be used as a carrier. While a thin metal foil, such as a 3 mil aluminum foil, has the disadvantages previously cited, a relatively thin coating of one of the aforementioned thermoplastics or thermosetting resins or a thin metal foil could provide an acceptable casting medium essentially without those deficiencies.

e) Metallized or Metal Foil Laminated Plastic Films may be used as carriers. Any of the acceptable plastics, or even elastomers, in thin sheet or film form could be metallized or laminated between very thin metal foils to provide the good wettability and release properties of the metal while eliminating their disadvantages. In particular, a high temperature cured fluoroelastomer even in very thin (about 2 mil) sheet form sandwiched between thin aluminum foils could have excellent utility as a casting medium. Similarly the coated or laminated textiles mentioned in (c) above could be laminated between metal foils to provide a metal surfaced, dimensionally stable high temperature carrier with excellent toughness (tear resistance) to improve durability in use, compliance to roll and metering surfaces in the equipment, while offering excellent strippability and fluid wettability.

It is clear from this discussion that a large number of carrier options exist for the invention process which go well beyond the metal carriers of the prior art. This is true not only for lower temperature processes for casting low melting polymers, but even for the highest melting perfluoropolymer (PTFE) for which a polyimide casting surface is in fact preferred, and which exhibits excellent performance as demonstrated in the Examples. Such a surface is also suitable for casting TFE copolymers with perfluoro (propyl vinyl ether) such as Teflon ® PFA. This latter observation is rather surprising since the Kapton ® F products are based upon reasonably well-bonded Teflon ® FEP and PFA coatings on Kapton ® H. This would seem to speak to a requirement for close control of the thermal history of such copolymers in contact with a carrier containing polyimide resin on its surface as a film or coating.

2. Nature of the Casting Fluids

The casting fluids of the prior art contain about 12% of the surfactant Triton ® X-100 (octyl phenoxy polyethoxy ethanol) by weight based upon resin solids and it is taught that this is required to improve the wetting characteristics of the casting fluids on the metal carrier. It is also taught that 6% Triton ® X-100 is insufficient for uniform wetting, while more than 12% leads to non-uniform film thickness by increasing the viscosity of the fluid.

In contrast, the Examples in accordance with the present invention indicate that 6% Triton ® X-100 is effective in the dispersions employed to produce high quality films at high linear web rates. Thus, it appears that the incorporation of a metering device allows a reduction in the amount of surfactant used in the prior art processes. While not intending to be limited to a particular mechanism, it is believed that this occurs because the prior art process relied upon the solids level (specific gravity of the casting fluids) to control the thickness of the deposited resin on each pass. The viscosity of such dispersions is very low, generally less than about 17 cp at 60% solids, and this low viscosity is required to limit the buildup of resin to less than about 0.37 mils per pass the critical cracking thickness of such dispersions; i.e. the thickness above which mud-cracked deposits form upon drying of the dispersion.

Using the invention, however, it was found that excellent quality films may be produced at high carrier speeds, and at more modest surfactant levels (6% Triton ® X-100), and that solids levels up to about 60% may be employed to obtain films of excellent quality. This is advantageous as it reduces the amount of surfactant and dispersion liquid that must be removed in the drying zone and the bake/fuse zone. Further, the wetting characteristics of the casting fluids may be controlled by means of additional fluorosurfactants, for example fluorinated alkyl polyoxy ethylene ethanol surfactants such as Fluorad ® FC-170C from 3M or silicone-based surfactants such as Union Carbide's L-77. These surfactants are effective in reducing the surface tension of the casting fluids in much more modest quantities than is Triton ® X-100, and they can be more rapidly eliminated by thermal decomposition, volatilization, or sublimation in the baking zone of the invention art equipment.

It was also surprisingly found that uncracked resin deposits can be formed at thicknesses well in excess of the critical cracking thickness associated with the dispersions employed. As mentioned in Example 5 hereinbelow, this is not fully understood but may relate to the fact that one of the ionic additives employed, FC-170C, is known to promote a rapid increase in fluid viscosity at elevated temperatures in the case of Triton ® X-100 containing dispersions. It is speculated that as the dispersion starts to dry at the very rapidly increasing temperatures characteristic of high speed processing, the drying resin has less time to drain itself of water prior to evaporation, resulting in a thicker resin deposit of lower apparent density prior to complete drying. Consequently, the deposit is less prone to crack if the shrinkage forces which induce cracking are dependent upon more intimate particulate contact. The well known tendency of dispersion—derived PTFE to fibrillate upon intimate particulate contact may in fact be the phenomenon responsible for the mud cracking ordinarily observed when PTFE dispersions dry in the presence of more modest time/temperature gradients than those characteristic of the invention process. This could also account for the surprisingly good mechanical qualities of the films made by the invention process after final fusion.

It is desirable, in general, to identify the most appropriate hydrocarbon surfactant(s) for any given casting fluid which in combination with relatively minor quantities of fluorosurfactants yields the desired result of high deposition rates (build per pass) without cracking, and facile decomposition, volatilization, or sublimation of non-polymeric additives. Since the maximum temperature desirable for film consolidation upon final fusion will depend upon the melting point of the specific polymers in the films, the optimum level and chemical nature of such surfactants can be different for various film compositions. Ionic additives other than the fluorosurfactants may be employed to advantage in casting fluids to engender a rapid increase in viscosity upon drying. These could include salts such as ammonium acetate, or other salts equally fugitive in the process, or salts such as potassium chlorate which can induce decolorization of the fused films at very minor levels. Such casting fluids which contain specific additives contributing to the high quality of the films produced by the invention process are well beyond the simple surfactants associated with the prior art process for film casting.

3. Nature of the Methods Used to Apply the Casting Fluids to the Carrier

The prior art casting process is essentially a free dipping process in which the only significant controlling factors of the amount of resin deposited on the carrier are the solids level in the dispersion and linear carrier rate. Thus, for any given fluid, the web speed is limited to a maximum carrier speed above which the pick up of resin on the carrier exceeds the critical cracking thickness. This limitation, combined with the limitations imposed by metal carrier belts and the deterioration of product quality noted at high carrier speeds led to usage of carrier speeds of 3 to 8 linear feet per minute in most cases.

In the method of the invention, however, metering bars are used to enable much more rapid linear travel of the carrier, up to at least 6× that of the prior art process. In the process of the invention, the speed of the carrier belt is limited essentially only by the length of the drying/fusing zone, i.e., the carrier cannot move so rapidly that drying does not occur within the drying zone provided and fusion within the fusing zone provided. The wiping action of the metering bars removes the excess casting fluid associated with high speed carrier travel so that an uncracked deposit of dried resin may be obtained prior to final fusion of that deposit.

The selection of metering bars, however, is not trivial since it is undesirable to introduce shearing of the casting fluids sufficient to coagulate the resin contained in the reservoir between the cavities of the metering bar and the moving carrier. The size and shape of the metering cavity is dependent upon the shear stability of each specific casting fluid. Additives to minimize polymer shearing by the metering bars may also be used in the casting formulations. For example, foaming at the metering bars over an extended period of time could introduce unacceptable shearing at the bars. This may be ameliorated by using an antifoam such as Dow-Corning FG-10, as well as fluorosurfactants such as 3M's Fluorad ® FC-146 (perfluoroammonium octanoate). Since the invention fluids can contain widely different polymers with particles of varying shear sensitivity, variable solids content, particle size, and surfactant systems, the selection of a bar geometry (cavity size and shape) specific to any given casting fluid is more difficult to model than to identify by trial and error. The Examples provided herein indicate the general variety of bars (and therefore cavities) which have facilitated the production of high quality films by the invention process at high productivity.

4. Nature of the State of Consolidation of the Casting Fluids and Resins From Metering Through Drying and Fusion The prior art process may be characterized as providing an effective and very simple means to deposit casting fluids on a carrier at a rate which is limited by the critical cracking thickness of the casting formulation. The drying of the casting fluids of the prior art process occurs at a relatively modest thermal gradient and over a relatively long time and is a function of the web speed and drying/baking temperatures. Fusion and recrystallization occurred over periods of about 2.5 minutes up to as much as 35 minutes or more, leading to good quality films, but low productivity.

In the method of the invention, consolidation from resin containing fluid to the final fused film proceeds over a much shorter time. Specifically, the total residence time in each of the drying zone and the bake-fuse zone is preferably less than about 1.5 minutes, most preferably less than 1 minute and may be substantially shorter. This can lead to a higher than critical cracking thickness build rate of uncracked resin deposits which can increase real productivity by at least 30% in the case of monolithic PTFE films. Combining that productivity with even a 4× improvement in linear travel rate for the carrier can lead to a 520% improvement in space/time yields, i.e., the number of pounds of film produced per hour relative to the prior art process in the case of PTFE. Other resin formulations will have quantitatively different improvements in productivity, but would be expected to be qualitatively similar. This level of improvement in the productivity of the invention process results, in fact, in space time yields approaching or exceeding that of a melt extruder for fluoropolymers such as FEP. Thus, the invention process has the desired characteristics of high productivity and high quality at a cost comparable to that of extruded films.

It is characteristic of the invention method that a shorter total residence time is employed for evaporation of the water, baking of the dried solids, and fusion of the baked solids to a polymeric melt that has heretofore been described for fluoropolymer film production. The actual time during which the polymers are actually in the melt, undergoing consolidation at the highest process temperature, is shorter than that of the prior art, but nonetheless results in excellent consolidation as judged by the ultimate tensile strength and elongation of the film produced.

Additionally, the rate of recrystallization/solidification of the melt is much more rapid then in the prior art process. This results in a film of greater optical clarity, particularly in the case of PTFE containing film. Since the rate of recrystallization of PTFE is a strong function of cooling rate, it is believed that such films produced by the invention process are either lower in crystallinity level, or the domains of crystallinity are smaller than can be achieved by prior art methods of cast film manufacture. This is corroborated by a somewhat lower melting point and heat of recrystallization for PTFE films produced by the invention process.

Thus, films produced by the invention process are expected to have greater flexural endurance and lower flexural modulus than films produced by the prior art process, particularly in the case of PTFE containing films.

The method of the invention can also be used to produce complex multi-layer films with a very wide range of compositions, some of which could not be produced by melt extrusion at all due either to a disparate rang of melting or decomposition temperatures, or to disparate ranges of melt viscosities for the resin blends. In particular, the method is useful for producing fluoropolymeric films in which the fluorpolymer is selected from the group consisting of fluorine-containing homopolymers, copolymers and terpolymers of tetrahaloethylenes, vinyl fluoride, vinylidene fluoride, hexafluoropropylene, perfluoroalkyl vinyl ethers, ethylene and propylene. Moreover, degradation of properties due to thermal exposure is dramatically reduced as a result of the exceedingly brief exposure to consolidating (fusion) temperatures. Thus, the invention provides improved productivity and in many cases superior products than the prior art casting process. The invention will be further illustrated by way of the following nonlimiting examples.

EXAMPLE 1

The casting tower utilized was composed of a dip pan under a 16 foot vertical oven divided via air flow into an 8 foot drying zone and a bake/fuse zone of 8 feet. Captured within the 8 foot bake/fuse zone was an electric radiant zone of 4 feet vertical height, with a maximum watt density of 22 watts per square inch. After passing through the tower the web was cooled by a cooling plenum, and then passed over a head roll on its way to the windup. A high quality PTFE film was cast on a 0.005 inch thick polyimide film carrier (Kapton ® H from E. I. DuPont) in five successive passes to obtain a 0.002 inch thick PTFE film with an ultimate tensile strength of 6902 psi and an ultimate elongation of 695%. To do this, an Algoflon ® dispersion (D60 Exp 1 from Ausimont) was let down to a specific gravity of 1.34 with water. To this was added Union Carbide L-77 surfactant at 1.0% by weight of the liquid. This dispersion was metered onto the carrier by using 1 inch diameter stainless steel metering bars, wound with 0.040 inch stainless steel wire on each face of the carrier. The metering bars were located about 12 inches above the dispersion bath with 2 inches vertical separation and approximately ½ inch overlap. The carrier was run at 17 fpm. The tower heat conditions were determined by the following set points: drying zone/250° F., bake-fuse zone/300° F., radiant electric zone controlled to give a web temperature of 770° F. as measured by an optical pyrometer. Multiple test samples (½"×8") gave an average ultimate tensile strength of 6240 psi and an average ultimate elongation of 595%. The quality of this film, produced at a linear rate about 3.4× that of prior art casting methodology, is significantly better than the prior art films produced by casting at lower carrier rates with longer drying and baking times (4000 to 4500 psi and 400 to 450% ultimate tensile strength and elongation, respectively).

EXAMPLE 2

A multi-pass high quality film was produced on the pilot tower (previously described in Example 1) utilizing the following procedure. Algoflon ® D60 Expl resin was let down to 1.49 specific gravity with a 6% Triton ® X-100 solution in water. To this was added 200 cc per gallon of a 5% stock solution of 3M fluorosurfactant FC-170C in water. Also added at 2%g by weight of solids was a gold pigment (Mearl Corp Super Gold 239Z). This dispersion was metered directly onto a 0.005 inch thick polyimide (Kapton ® H) carrier using ½ inch diameter #22 wirewound metering bars for four passes (bars located as previously described ) and a coarser metering bar (½ inch diameter bar wound with #30 wire overlayed with #5 wire) for the fifth pass. The dispersion bath was then changed to DuPont T30B PTFE resin dispersion which had been let down to 1.40 specific gravity with a 6% Triton ® X-100 (Rohm and Haas) solution and 100 cc per gal. of the previously described 5% fluorosurfactant stock solution. To the dispersion was added 8% by weight of solids of Borden's Aquablack AB 135 pigment. Two passes of this black formulation were then metered onto the "Gold" PTFE cast film using the "5 over 30" metering bars. A final pass of DuPont's TE9503 FEP dispersion at a 1.25 specific gravity (let down with water) was then metered on as a bonding layer. All passes were run at a web speed of 22 fpm. The previously described casting tower had a drying zone temperature set point of 250° F. with a bake and fuse zone temperature set point of 680° F. The radiant zone was set to control at 760° F. for the gold passes and at 720° F. for the black passes and the FEP pass. The final film was 0.0039 inches thick, readily removed from the carrier, and of excellent physical properties for a filled resin. Physical testing indicated an ultimate tensile strength of 5244 psi and a 470% ultimate elongation, at least as good a quality as that which would be obtained by prior art casting methodology but obtained at a 4.5× web rate.

EXAMPLE 3

To show the effect of reduced thermal mass, a 0.002 inch thick PTFE film was cast on a 0.003 inch thick aluminum foil carrier in six passes using the previously described casting tower. The PTFE dispersion was DuPont's T30B let down to a 1.34 specific gravity with water. The dispersion was metered on to the aluminum foil using 1 inch diameter, #40 wirewound metering bars, as described in previous Examples, at 14 fpm carrier speed. The tower was set for a drying zone temperature of 250° F. and a bake-fuse zone temperature of 680° F. for the first two passes. The upper zone was increased to 710° F. for the next four passes. The final film was stripped from each side of the carrier with minimal difficulty, and had a tensile strength of approximately 4500 psi, as good as that obtainable with prior art casting methodology but produced at a 2.8× linear web speed. Although this unmodified aluminum foil carrier is probably unsuitable for routine use as it annealed during the bake/fuse step, it shows that reduced thermal mass carrier with aluminum surfaces would be suitable if used in forms less sensitive to thermal effects as described hereinabove.

EXAMPLE 4

A very high quality thin PTFE film was cast in four passes at 25 fpm web speed for each pass. The previously described casting tower was set for a drying zone temperature of 250° F., a bake-fuse temperature of 680° F., and a radiant zone control temperature of 770° F. The PTFE dispersion employed was Algoflon ® D60 Exp 1 which had been let down to 1.50 specific gravity with a 6% Triton ® X-100 and water solution. To this was added the previously described 5% stock solution of FC-170C (100 cc per gallon of dispersion). The dispersion was metered onto the 0.005 inch thick polyimide film carrier (Kapton ® H) using ½ inch diameter, #14 wirewound bars. The resulting 0.011 inch thick film had an ultimate tensile strength as high as 7029 psi and an ultimate elongation of 550%. This dramatic improvement in quality relative to similar films produced by the prior art casting methodology was obtained along with a 5× improvement in productivity as measured by relative linear web rates.

EXAMPLE 5

In this example a high quality film was achieved using high speed film production techniques on a 0.005 inch polyimide carrier (Kapton ® H) using the previously described casting tower. The PTFE dispersion was Algoflon ® D50 Exp 1 (Ausimont) let down to 1.50 specific gravity with a 6% Triton ® X-100 solution and 100 cc per gal. of FC-170C 5% solution as previously described. The dispersion was metered onto the carrier in six passes using ½ inch diameter, #26 wirewound bars at 25 fpm linear web speed. The final film stripped easily from the carrier and was 0.038 to 0.040 inches thick. Its ultimate tensile strength was as high as 6350 psi and its ultimate elongation was 640%: a forty percent improvement in tensile strength and elongation with a 5× improvement in productivity relative to prior art casting methodology. The thermal settings for this run were: drying zone/250° F., bake-fuse zone/680° F., radiant zone/auto controlled at 770° F. The build of resin per pass was in excess of 0.00067 inches, significantly greater than the 0.0004 to 0.00045 inches one would predict from measurements of critical cracking thickness associated with this dispersion. While not fully understood, this behavior is reproducible and is believed to be associated with the dynamics of the fluid consolidation to a dried but uncracked film (while still unfused) in the thermal environment of this particular tower. This condition appears to lead to uncracked films, surprisingly about 50% thicker than expected and of very high quality.

EXAMPLE 6

In this example a high quality film was achieved using high speed film production techniques on a 0.005 inch polyimide carrier (Kapton ® H) using the previously described casting tower. The PTFE dispersion was DuPont T30B let down to 1.33 specific gravity with water. The dispersion was metered onto the carrier using 1 inch diameter, #40 wirewound metering bars, yielding a 3.3 mil film in seven passes. The thermal settings for this run were: drying zone/250° F., bake-fuse zone/710° F., radiant zone/auto controlled at 780° F. The carrier rate was 26 feet per minute.

The following Table indicates some significant differences between this film, cast PTFE films of the prior art, and skived PTFE film.

|  | Thickness (mils) | Tensile Strength | | Ult. Elongation | | Elastic Modulus | | Tm °(C.) | Hm (J/g) |
|---|---|---|---|---|---|---|---|---|---|
|  |  | MD | TD | MD | TD | MD | TD |  |  |
|  |  | (psi) | | (%) | | ($\times 10^{-3}$ psi) | | | |
| Skived PTFE |  |  |  |  |  |  |  |  |  |
| (Chemplast) | 1.9 | 7580 | 5860 | 450 | 360 | 68 | 75 | 327.6 ± 0.1 | 21.2 |
| Cast PTFE | 1.7 | 4580 | 5250 | 420 | 520 | 67 | 64 | 325.0 ± 0.1 | 22.8 |
| (Prior Art: |  |  |  |  |  |  |  |  |  |
| Toralon DF-100 |  |  |  |  |  |  |  |  |  |
| Cast PTFE | 3.3 | 5190 | 5000 | 530 | 510 | 63 | 63 | 324.2 ± 0.1 | 19.1 |

| | | Tensile Strength | | Ult. Elongation | | Elastic Modulus | | | |
|---|---|---|---|---|---|---|---|---|---|
| | Thickness (mils) | MD | TD | MD | TD | MD | TD | Tm °(C.) | Hm (J/g) |
| | | (psi) | | (%) | | ($\times 10^{-3}$ psi) | | | |
| (Invention Art) | | | | | | | | | |

MD = Machine Direction, TD = Transmission Direction

These data demonstrate the more anisotropic elongation of the cast films vs skived films, with the invention film being clearly the most isotropic. The reduced elastic modulus of the cast films is also evident.

The melting pint (Tm) of the cast film made by the invention method is significantly lower than the prior art cast film and its heat of fusion (Hm) is drastically reduced. The observation of pure PTFE with a melting temperature below 325° C. and a heat of fusion less than 22 joules/gram is indicative of a film with greater optical clarity suggesting lower crystallinity or smaller crystallinites. Further, this behavior should extend to mixtures of PTFE with other materials, although the exact numbers will depend on the proportions and the amount of effect on freezing point due to interactions of the polymers.

We claim:

1. A fluoropolymeric film comprising at least one fluoropolymer-containing layer formed by
   (a) preparing an aqueous dispersion comprising a fluoropolymer;
   (b) dipping a carrier belt through the dispersion such that a coating of the dispersion is formed on the carrier belt;
   (c) passing the coated carrier belt through a metering device to remove excess dispersion;
   (d) drying the metered coated carrier belt to remove the water from the dispersion;
   (e) heating the dried coated carrier belt to a temperature sufficient to consolidate the dispersion;
   (f) cooling the consolidated coated carrier belt; and
   (g) stripping the consolidated fluoropolymeric film from the carrier belt, wherein the carrier belt is formed from a material of low thermal mass having chemical and dimensional stability at the consolidiation temperature of the dispersion and a work of adhesion that does not exceed the yield strength of the consolidated fluoroplymeric film.

2. A fluoropolymeric film according to claim 1, wherein the fluoropolymer is selected from the group consisting of fluorine-containing homopolymers, copolymers and terpolymers of tetrahaloethylenes, vinyl fluoride, vinylidene fluoride, hexafluoropropylene, perfluoroalkyl vinyl ethers, ethylene and propylene.

3. A fluoropolymeric film according to claim 1, wherein the film comprises a plurality of fluoropolymer-containing layers formed by successively repeating steps (a) through (f) and then stripping the consolidated multilayer film from the carrier belt.

4. A method for preparation of a fluoropolymeric film on a carier, comprising:
   (a) preparing an aqueous dispersion comprising a fluoropolymer;
   (b) dipping a carrier belt through the dispersion such that a coating of the dispersion is formed on the carrier belt;
   (c) passing the coated carrier belt through a metering device to remove excess dispersion;
   (d) drying the metered coated carrier to remove the water from the dispersion; and
   (e) heating the dried coated carrier to a temperature sufficient to consolidate the dispersion, wherein the carrier belt is formed from a material of low thermal mass having chemical and dimensional stability at the consolidation temperature of the dispersion and a work of adhesion that does not exceed the yield strength of the consolidated fluoropolymeric film.

5. A method according to claim 4, wherein the carrier belt is dipped in the dispersion at a rate of at least 10 linear feet per minute.

6. A method according to claim 5, wherein the heating step takes less than 1.5 minutes.

7. A method according to claim 4, wherein the aqueous dispersion further comprises a surfactant in an amount effective to facilitate wetting of the carrier belt by the aqueous dispersion.

8. A method according to claim 7, wherein the surfactant is selected such that it is thermally or oxidatively fugitive at a temperature at or below the consolidation temperature of the dispersion.

9. A method according to claim 7, wherein the surfactant is octylphenoxy polyethoxy ethanol at a concentration of about 6%.

10. A method according to claim 7, wherein the surfactant is octylphenoxy polyethoxy ethanol at a concentration of about 6% together with a fluorinated ionic surfactant.

11. A method according to claim 4, wherein the carrier is selected from among films of high melting thermoplastics, films of thermosetting plastics, coated or laminated textiles formed from a thermally stable plastic or resin and a thermally stable reinforcement, a plastic coated metal foil and metallized or metal foil laminated thermally stable plastic or resins.

12. A method according to claim 4, wherein the fluoropolymer is selected from the group consisting of fluorine-containing homopolymers, copolymers and terpolymers of tetrahaloethylenes, vinyl fluoride, vinylidene fluoride, hexafluoropropylene, perfluoroalkyl vinyl ethers, ethylene and propylene.

* * * * *